(12) United States Patent
Mogi et al.

(10) Patent No.: US 9,512,953 B2
(45) Date of Patent: Dec. 6, 2016

(54) THERMAL INSULATION LAMINATE

(71) Applicant: SHIN-ETSU CHEMICAL CO., LTD., Chiyoda-ku, Tokyo (JP)

(72) Inventors: Hiroshi Mogi, Tokyo (JP); Yoshihiro Kubota, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 293 days.

(21) Appl. No.: 14/146,988

(22) Filed: Jan. 3, 2014

(65) Prior Publication Data

US 2014/0120794 A1    May 1, 2014

Related U.S. Application Data

(63) Continuation of application No. PCT/JP2012/066855, filed on Jul. 2, 2012.

(30) Foreign Application Priority Data

Jul. 6, 2011    (JP) .................................. 2011-149885

(51) Int. Cl.
*F16L 59/02* (2006.01)
*B32B 5/02* (2006.01)
(Continued)

(52) U.S. Cl.
CPC ................ *F16L 59/029* (2013.01); *B32B 5/02* (2013.01); *B32B 5/16* (2013.01); *B32B 7/02* (2013.01);
(Continued)

(58) Field of Classification Search
CPC ............... B32B 17/064; B32B 2255/10; B32B 2255/20; B32B 2262/101; B32B 2264/102; B32B 2264/105; B32B 2307/304;B32B 2307/412; B32B 2307/584; B32B 2307/704; B32B 2307/71; B32B 2605/006; B32B 27/12; B32B 27/30; B32B 5/02; B32B 5/16; B32B 7/02; B32B 7/12; B60J 1/20; F16L 59/029; Y10T 442/623; Y10T 442/676; Y10T 442/699
(Continued)

(56) References Cited

U.S. PATENT DOCUMENTS 3,682,528 A    8/1972  Apfel et al.
4,337,990 A    7/1982  Fan et al.
(Continued)

FOREIGN PATENT DOCUMENTS

JP    2003-251728    *  9/2003    ............... B32B 7/02
JP    2003-251728 A     9/2003
(Continued)

OTHER PUBLICATIONS https://www.dowcorning.com/content/publishedlit/Sealants_and_Adhesives_factsheet.pdf—Jun. 2007.*
(Continued)

*Primary Examiner* — Arti Singh-Pandey
(74) *Attorney, Agent, or Firm* — Manabu Kanesaka

(57) ABSTRACT

Provided is a thermal insulation laminate having both of an excellent thermal insulation property and high visible light transmittance, and further having a provided antifouling property and an excellent scratch resistance. A thermal insulation laminate includes a photocatalytic layer (4); a transparent thermal insulation layer (10) having two transparent base plates (1, 1) and composite materials including a fiber assembly (2) and inorganic particles (3) therebetween; and an adhesive layer (5); the photocatalytic layer (4) is an outermost layer of one side thereof, and the adhesive layer (5) is an outermost layer of other side. A hard coat layer (Continued)

may be sandwiched in either at least one of between the photocatalytic layer (4) and the transparent thermal insulation layer (10), and between the transparent thermal insulation layer (10) and the adhesive layer (5).

15 Claims, 4 Drawing Sheets

(51) Int. Cl.
| | | |
|---|---|---|
| *B32B 5/16* | (2006.01) | |
| *B32B 7/02* | (2006.01) | |
| *B32B 17/06* | (2006.01) | |
| *B60J 1/20* | (2006.01) | |
| *B32B 7/12* | (2006.01) | |
| *B32B 27/12* | (2006.01) | |
| *B32B 27/30* | (2006.01) | |

(52) U.S. Cl.
CPC ............... *B32B 7/12* (2013.01); *B32B 17/064* (2013.01); *B32B 27/12* (2013.01); *B32B 27/30* (2013.01); *B60J 1/20* (2013.01); *B32B 2255/10* (2013.01); *B32B 2255/20* (2013.01); *B32B 2262/101* (2013.01); *B32B 2264/102* (2013.01); *B32B 2264/105* (2013.01); *B32B 2307/304* (2013.01); *B32B 2307/412* (2013.01); *B32B 2307/584* (2013.01); *B32B 2307/704* (2013.01); *B32B 2307/71* (2013.01); *B32B 2605/006* (2013.01); *Y10T 442/623* (2015.04); *Y10T 442/676* (2015.04); *Y10T 442/699* (2015.04)

(58) Field of Classification Search
USPC ......................................... 442/348, 396, 417
See application file for complete search history.

(56) References Cited

U.S. PATENT DOCUMENTS

| | | | | |
|---|---|---|---|---|
| 5,071,206 | A | * 12/1991 | Hood | ...................... B32B 17/10 |
| | | | | 204/192.27 |
| 6,045,896 | A | * 4/2000 | Boire | ...................... C03C 17/36 |
| | | | | 204/192.23 |
| 2007/0146887 | A1* | 6/2007 | Ikeda | ...................... G02B 1/111 |
| | | | | 359/586 |
| 2013/0250406 | A1* | 9/2013 | Nakajima | ............... G02B 5/282 |
| | | | | 359/359 |

FOREIGN PATENT DOCUMENTS

| | | | |
|---|---|---|---|
| JP | 2006-334787 A | | 12/2006 |
| JP | 2007-327320 A | | 12/2007 |
| JP | 2008-223261 | * | 9/2008 |
| JP | 2008-223261 A | | 9/2008 |
| WO | 90/08334 A1 | | 7/1990 |

OTHER PUBLICATIONS

International Search Report of PCT/JP2012/066855, Form PCT/ISA/210.

* cited by examiner

THERMAL INSULATION LAMINATE

RELATED APPLICATIONS

The present application is a PCT Continuation application based on PCT/JP2012/066855 filed Jul. 2, 2012, and claims priority from Japanese Application No. 2011-149885, filed Jul. 6, 2011.

BACKGROUND OF THE INVENTION

Technical Field

The present invention relates to a thermal insulation laminate having a thermal insulation effect while ensuring transparency to visible light, when the thermal insulation laminate is used by being stuck on window glasses of buildings or automobiles.

For preventing a heat loss through a window in a cold climate and the penetration of heat from a window in a warm climate while securing visibility through the window, a laminated glass, a heat reflecting film and a transparent thermal insulation film have been used on window glasses of buildings, vehicles etc. Also transparent thermal insulation films used by being stuck on window glasses are manufactured and sold in a market for saving energy to solve the recent energy problems. However, such commercially available transparent thermal insulation films have not yet been widely applied to windows of houses, buildings and automobiles etc.

Originally transparency and thermal insulation property are contradicting characteristics, and, at present, transparent thermal insulation films for windows having necessary transparency, more specifically a visible light transmittance, and sufficient thermal insulation property are less common. For example, when the visible light transmittance in a commercially available transparent thermal insulation film for the window of an automobile exceeds 70%, the thermal insulation property thereof becomes over 0.7 of a solar radiation shading coefficient. However, a transparent thermal insulation films having around 0.6 of a solar radiation shading coefficient to improve the thermal insulation property does not achieve 70% of the visible light transmittance.

The solar radiation shading coefficient is the index that determines the efficiency of which the sunlight is shielded. In particular, when the solar radiation shading coefficient of a transparent glass with 3 mm-thick is defined as 1, the solar radiation shading coefficient of a transparent glass with 6 mm-thick which is stuck on a film is a ratio of amount of solar radiation into a room through it.

Other than the transparent thermal insulation films, thermal insulation laminated bodies have already been proposed as well. For example, Patent Document 1 discloses a transparent thermal insulation laminate which is composed of three layers consisting of a titanium oxide layer/a silver layer/a titanium oxide layer as essential features. Patent Document 2 discloses a constitution consisting of a silver layer sandwiched between two nickel layers which make the silver layer thin in order to enhance transparency thereof. And Patent Document 3 discloses a transparent thermal insulation laminate composed of five layers of an indium oxide layer/a silver layer/an indium oxide layer/a silver layer/an indium oxide layer, both silver layers of which are sandwiched with the indium oxide layers of dielectric. Patent Document 4 discloses a transparent thermal insulation laminate comprising a transparent dielectric layer as an optical compensation layer composed of a metal oxide such as indium tin oxide (ITO) instead of a conventional transparent dielectric layer.

Prior Art Documents

[Patent Document 1] U.S. Pat. No. 4,337,990B
[Patent Document 2] U.S. Pat. No. 3,682,528B
[Patent Document 3] JP Patent Publication No. 2901676B
[Patent Document 4] JP Patent Application Publication No. 2006-334787A

SUMMARY OF THE INVENTION

Problems to be Solved by the Invention

The above-mentioned conventional transparent thermal insulation films and thermal insulation laminated bodies are not capable of achieving sufficient energy saving by the desired thermal insulation effect while ensuring necessary transparency. Accordingly, an object of the present invention is to provide a thermal insulation laminate having both excellent thermal insulation property and high visible light transmittance, and being provided with an antifouling property and an excellent scratch resistance.

Means for Solving the Problems

A thermal insulation laminate of the present invention developed to achieve the above-mentioned objects comprises a photocatalytic layer; a transparent thermal insulation layer having two transparent base plates and composite materials comprising a fiber assembly and inorganic particles therebetween; and an adhesive layer; the photocatalytic layer is an outermost layer of one side of the thermal insulation laminate, and the adhesive layer is an outermost layer of other side thereof In the thermal insulation laminate, a hard coat layer may be sandwiched in either at least one of between the photocatalytic layer and the transparent thermal insulation layer, and between the transparent thermal insulation layer and the adhesive layer.

In the thermal insulation laminate, a material of the transparent base plate may be a polyvinyl butyral.

In the thermal insulation laminate, a fiber diameter of the fiber assembly may be 700 nm at a maximum.

In the thermal insulation laminate, the fiber assembly may be composed of consecutive or non-consecutive silica fiber spun by an electrospinning method.

In the thermal insulation laminate, the inorganic particles may be hollow silica particles.

In the thermal insulation laminate, the photocatalytic layer may be formed by applying a coating solution containing photocatalyst particles and a water soluble binder.

In the thermal insulation laminate, the photocatalyst particles may be photocatalytic particles supporting metal, metal oxide or/and metal compound wherein metal thereof is selected from the group consisting of vanadium, manganese, iron, cobalt, nickel, copper, zinc, niobium, molybdenum, ruthenium, rhodium, silver, tin, tungsten, platinum and gold on crystalline fine particles of metal oxide having n-type semiconductivity.

In the thermal insulation laminate, the water soluble binder may contain a compound which a hydrolytic silicon compound is hydrolyzed in a mixture solvent of water, a basic compound and a polar solvent.

In the thermal insulation laminate, the adhesive layer may be composed of a silicone-based adhesive.

In the thermal insulation laminate, the hard coat layer may be composed of a silicone-based hard coat material.

In the thermal insulation laminate, the silicone-based hard coat material may be a photocurable silicone-based hard coat material.

In the thermal insulation laminate, a total light transmittance of the thermal insulation laminate may be at least 60%.

A transparent thermal insulation film may be comprised of the thermal insulation laminate.

Effects of the Invention

The thermal insulation laminate of the present invention has high total light transmittance and excellent thermal insulation property. Also, the thermal insulation laminate has an excellent antifouling property due to having a photocatalytic layer of outermost layer on one side. Because the thermal insulation laminate has the adhesive layer at outermost layer on the other side, the thermal insulation laminate may be easily stuck on windows. Further, in case where the constitution thereof is composed with the hard coat layer, the thermal insulation laminate and the thermal insulation film having scratch resistance can be obtained.

Herein, a total light ray includes wavelength range of visible light. When the total light transmittance of the thermal insulation laminate of the present invention is high, it means that transparency of the visible light ray is excellent.

EXPLANATIONS OF LETTERS OR NUMERALS

Numerals mean as follows. 1: transparent base plate, 2: fiber assembly, 3: inorganic particles, 4: photocatalytic layer, 5: adhesive layer, 6: hard coat layer, 10: transparent thermal insulation layer

DETAILED DESCRIPTION OF THE INVENTION

Hereunder, the thermal insulation laminate and the thermal insulation film of the present invention will be explained in detail describing the embodiments. However, these embodiments are the preferred examples of the present invention, and they are not intended to limit the present invention. Herein, the term "resin" exclusively means a high molecular compound in this specification.

Figure 1:
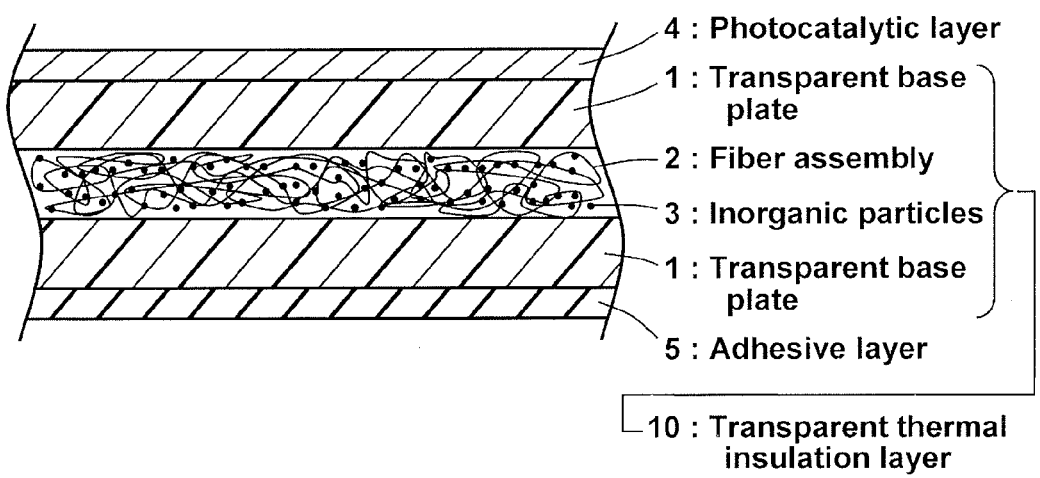
FIG. 1 is a schematic cross-sectional view showing an embodiment of the thermal insulation laminate of the present invention.

FIG. 1 shows the first embodiment of the thermal insulation laminate of the present invention, wherein a photocatalytic layer 4 is laminated onto one side of a transparent thermal insulation layer 10, and an adhesive layer 5 is laminated onto the other side thereof. The transparent thermal insulation layer 10 is composed of two transparent base plates 1, 1 and composite materials comprising a fiber assembly 2 and inorganic particles 3 that are sandwiched with the transparent base plate 1, 1.

Figure 2:
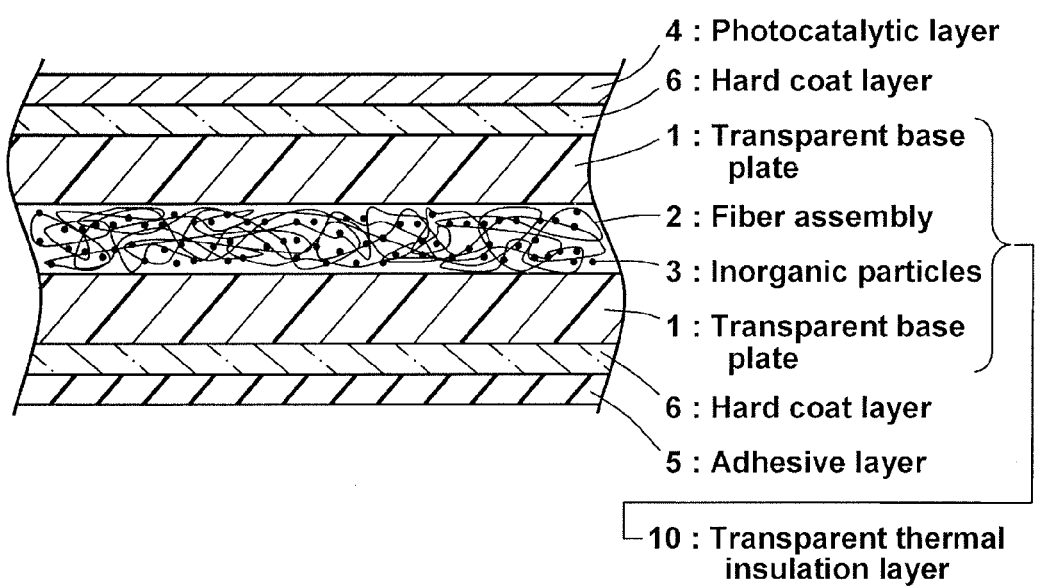
FIG. 2 is a schematic cross-sectional view showing another embodiment of the thermal insulation laminate of the present invention.

FIG. 2 shows the second embodiment of the present invention wherein hard coat layers 6, 6 are laminated onto both sides of the transparent thermal insulation layer 10, further, a photocatalytic layer 4 is laminated onto one outermost side surface of the hard coat layer 6, and an adhesive layer 5 is laminated onto one outermost side surface of the other hard coat layer 6.

Figure 3:
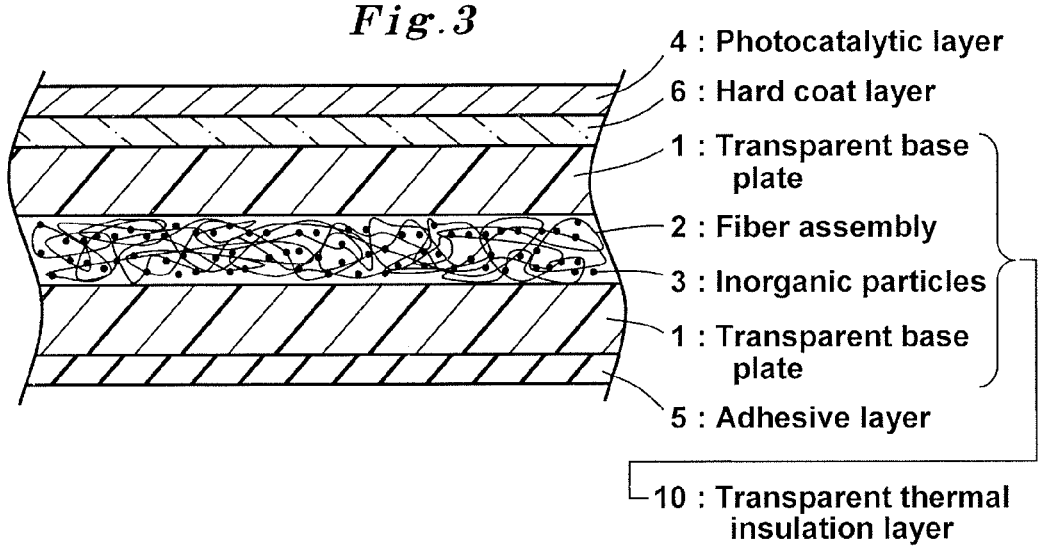
FIG. 3 is a schematic cross-sectional view showing the other embodiment of the thermal insulation laminate of the present invention.

FIG. 3 shows the third embodiment of the present invention, wherein a hard coat layer 6 is laminated onto one side of a transparent thermal insulation layer 10, and further a photocatalytic layer 4 is laminated onto surface of the hard coat layer 6, and an adhesive layer 5 is laminated onto the other side of the transparent thermal insulation layer 10.

Figure 4:
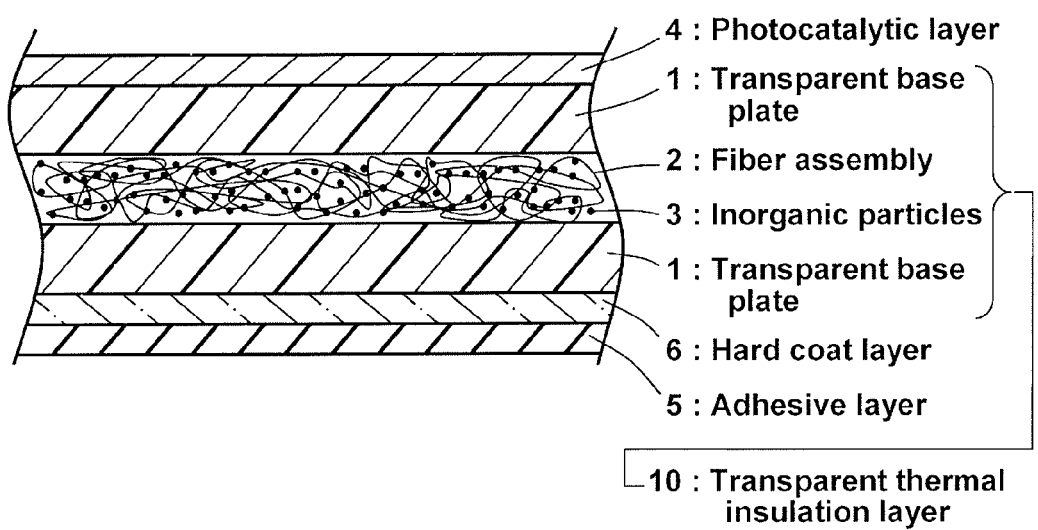
FIG. 4 is a schematic cross-sectional view showing the other embodiment of the thermal insulation laminate of the present invention.

FIG. 4 shows the fourth embodiment of the present invention, wherein a hard coat layer 6 is laminated onto one side of a transparent thermal insulation layer 10, further an adhesive layer 5 is laminated onto an outermost surface of the hard coat layer 6, and a photocatalytic layer 4 is laminated onto the other side of the transparent thermal insulation layer 10.

(1: Transparent Base Plate)

It is preferred that the transparent base plate is transmissive for a visible light (wavelength 400 to 700 nm), endures conditions (ex. a solvent, temperature and the like) for preparing the laminated layers, and has an excellent dimensional stability. The preferred transparent base plate may be made from a polyolefin, an acryl resin comprehending poly methyl methacrylate, a polycarbonate resin, a polyimide resin, an ethylene-vinyl acetate copolymer (EVA), polyvinyl butyral (PVB) and an ionomer resin and so on. Polyvinyl butyral (PVB) is especially preferred, because transparency, it ensures durability and the like. Well-known polyvinyl butyral (PVB) for optics may be employed.

A film-forming method of the transparent base plate made from polyvinyl butyral (PVB) on a substrate is not restricted, but a solution casting method is preferred therefor. According to the solution casting method, for example, a low-viscosity solution containing polyvinyl butyral (PVB) is applied on the substrate such as PET film, and heated by an oven at 100° C. to prepare the transparent base plate formed in a film shape. The low-viscosity solution contains polyvinyl butyral and an organic solvent. The organic solvent includes for example, chlorinated solvents (ex. chloromethylene and 1,2-dichloroethane), alcohols (ex. methanol, ethanol, n-propanol, isopropanol, n-butanol, isobutanol, and isoamyl alcohol), ketones (ex. acetone, methyl ethyl ketone, methyl isobutyl ketone and cyclohexanone, and diacetone alcohol), esters (methyl acetate, ethyl acetate, n-propyl acetate, isopropyl acetate, isobutyl acetate, and n-butyl acetate), aromatic compounds (ex. toluene, and xylene) and ethers (ex. 1,3-dioxolane, and tetrahydrofuran). The low-viscosity solution containing polyvinyl butyral may be prepared by using a blend of above-mentioned organic solvents. Examples of a preferred primary organic solvent in which polyvinyl butyral is dissolved are methyl ethyl ketone, chloromethylene, ethyl acetate and toluene.

The thickness of the transparent base plate comprising polyvinyl butyral is optionally selected according to any purpose, but as for the thermal insulation laminate and the transparent thermal insulation film, is preferably 150 μm or more. The thickness is more preferably 200 μm or more.

Further, the thickness is preferably 250 μm or more in usage mode which stiffness is required. Incidentally, the thermal insulation laminate and the transparent thermal insulation film are thicker than any one of the other layers such as the hard coat layer, the photocatalytic layer, the adhesive layer.

(2: Fiber Assembly)

A fiber diameter of fibers of the fiber assembly in the transparent thermal insulation layer is preferably up to 700 nm, more preferably up to 500 nm, still more preferably up to 400 nm. If the fiber diameter is larger than 700 nm, the total light transmittance tends to reduce because the obtained transparent thermal insulation laminate shall be opaque. A fiber length of fibers of the fiber assembly is preferred 5 μm or more, because in cases where the fiber length is too short, a reinforcing effect thereby is poor. The fiber length is not limited by an upper threshold, particularly.

As the fiber assembly, for example, various non-woven fabrics and woven fabrics may be employed. The fiber material thereof is silica, a glass or polyacrylate and polystyrene which transparency may be ensured. Among these materials, the silica fiber is preferred.

A spinning method of the silica fibers is not restricted particularly, and an electrospinning method, a steam jet method, an APEX (registered trademark) technology (Polymer Group Inc.) method and the like may be employed. Among these methods, the electrospinning method is preferred. According to the electrospinning method, the fibers having an uniform fiber diameter and an uniform fiber length can be prepared.

The electrospinning method is well-known as a fiber forming method by using an electrical power. According to the electrospinning method, a direct current voltage is applied between a nozzle for feedstock and a target substrate by a direct current power supply so that the nozzle side is a positive and the target substrate side is a negative. Thereby the feedstock is released from the nozzle to the target substrate, a deposition layer of nanofiber is formed onto the target substrate. The feedstock is sent to the nozzle which is made from conductive materials such as graphite, at constant speed. A tip of the feedstock which is sent out from the nozzle is melted and softened in flame of a burner. A high direct current voltage of 1 kV to 50 kV is applied between the nozzle and a metal target substrate such as stainless material. The melted nanofiber having the diameter of 1 μm or less is deposited on the metal target substrate from the nozzle by an electrostatic power. An outer diameter of the nanofiber may be adjusted by changing a sending speed of the feedstock (a glass materials), a flame temperature and an application voltage. A cylindrical-shaped metal target substrate is rotated and is reciprocated along a rotational axis direction, thereby the nanofiber may be deposited in the form of a flat shape thereon. Also, a flat-shaped metal target substrate is moved two-dimensionally on a XY stage, thereby the nanofiber may be deposited the flat shape thereon. The deposited nanofiber grows to a deposition layer (a silica fiber layer) of the fiber assembly. In order to maintain strength of the fiber assembly, a sizing material may be applied to the fiber assembly over or after depositing. Also, the fiber assembly may be reinforced by adding a binder. According to this process, the deposition layer (the silica fiber layer) which comprises the nanofiber having an uniform fiber diameter of several tens to several hundreds nanometer order is formed onto the target substrate.

In order to obtain glass fiber by the electrospinning method, a tip of glass materials consisting of glass rods or glass fibers having diameter of 0.1 to 2 mm is sent out from the nozzle as an electrode, the glass materials are melted and softened by a heating means. The high voltage is applied between the nozzle and the metal target substrate, thereby glass filaments are deposited on the metal target substrate by the electrostatic power. In this way, a non-woven fabric of the silica fibers is formed.

As material of the glass fiber, for example, glasses used for a printed circuit board illustrated by E-glass as a low-alkali glass for electric, D-glass as a low-dielectric constant glass and the like, and a quartz glass are exemplified. To use the quartz glass is preferred from the viewpoint of optical characteristics.

(3: Inorganic Particles)

As the inorganic particles which are mixed with the fiber assembly comprising especially the silica fibers and the glass fibers, hollow silica particles are preferred. A method for producing the hollow silica particles is not restricted, but the following method is preferred.

Colloidal calcium carbonate, a silicon alkoxide and a basic catalyst are added and mixed to water, so that the concentration is 75% by volume or more. Silica which is produced by a hydrolysis reaction of the silicon alkoxide is precipitated onto a surface of the colloidal calcium carbonate. Thereafter, calcium carbonate in a layer of silica is only resolved by an acid treatment. As a result, the hollow silica particles having the outer diameter range about 10 to 300 nm are prepared.

The outer diameter range of thus inorganic particles is preferably about 10 to 300 nm. When the outer diameter is too small, it is difficult to prepare the inorganic particles, or even if the inorganic particles are produced, it is easy to be aggregated.

In cases where the inorganic particles are the hollow silica particles, the hollow silica particles having the outer diameter of preferably 30 to 130 nm, more preferably 50 to 100 nm are easy to be prepared, are difficult to be aggregated, according to the results of experiments. Using thus hollow silica particles, the merits are sufficiently exerted thereby.

The additive amount of the hollow silica particles is preferably 5 to 100 parts by mass and more preferably 5 to 80 parts by mass, per 100 parts by mass of the silica fiber. In cases where the additive amount is within these ranges, the transparent thermal insulation layer may exhibit both of excellent thermal insulation property and high total light transmittance. If the additive amount is less than 1 part by mass, the thermal insulation property of the transparent thermal insulation layer tends to be reduced. If the additive amount exceeds 100 parts by mass, the total light transmittance of the transparent thermal insulation layer tends to be decreased and the transparent thermal insulation layer tends to be very brittle.

(4: Photocatalytic Layer)

As the photocatalytic layer in the thermal insulation laminate and the transparent thermal insulation film of the present invention, a photocatalytic film, which a photocatalytic coating solution containing the photocatalytic particles and a water soluble binder is applied onto a substrate, dried and cured, is preferred. The photocatalytic layer achieves an antifouling effect to the thermal insulation laminate and the transparent thermal insulation film.

As the photocatalyst particles, crystalline fine particles of metal oxide crystal of n-type semiconductor are employed. The crystalline fine particles include a titanium dioxide based, a tungsten oxide based, a zinc oxide based, a niobium oxide based particles and the like, all of which is now available on the market. For example, as the crystalline fine particles, anatase-type titanium dioxide ($TiO_2$), rutile-type titanium dioxide ($TiO_2$), tungsten trioxide ($WO_3$), zinc oxide (ZnO), Ga-doped zinc oxide (GZO), niobium oxide (Nb$_2$O$_5$) and the like may be employed. Particularly, the crystalline fine particles of the metal oxide in which nitrogen, sulfur, phosphorus, carbon or the like is doped are preferably employed. Also, the crystalline fine particles of the metal oxide which copper, iron, nickel, gold, silver, platinum, carbon or the like is supported on the surface thereof are preferably employed. These crystalline fine particles have a high visible light activity. More particularly, as the crystalline fine particles of the metal oxide with the high visible light activity include rutile-type titanium dioxide supporting platinum, rutile-type titanium dioxide supporting iron, rutile-type titanium dioxide supporting copper, rutile-type titanium dioxide supporting copper hydroxide, anatase-type titanium dioxide supporting gold, tungsten trioxide supporting platinum and the like. Furthermore, the crystalline fine particles having diameter of microscopic primary particle are preferably employed. That is, range of the diameter of the primary particle is preferably 1 to 100 nm, and more preferably 1 to 50 nm. If the diameter of the primary particle is greater than 100 nm, transparency reduction and appearance detraction tend to be caused to the coated film.

Thus photocatalytic particles with the high visible light activity include MPT-623 (visible-light-responsive photocatalyst, powdery, rutile-type titanium dioxide supporting platinum; manufactured by ISHIHARA SANGYO KAISHA, LTD.), MPT-625 (visible-light-responsive photocatalyst, powdery, rutile-type titanium dioxide supporting iron; manufactured by ISHIHARA SANGYO KAISHA, LTD.) and the like.

The water soluble binder containing the photocatalytic coating solution is preferably obtained by a procedure by which a silicon alkoxide represented by the following Formula (1) or condensation thereof is hydrolyzed in mixture of water, a basic compound and a polar solvent.

$$\text{Si}(\text{OR})_X(\text{OH})_{4-X} \tag{1}$$

R in Formula (1) independently represents a hydrogen atom or a functional group. R may be the same or different each other. As the functional group: R specifically, for example, includes a hydrogen atom (H), a methyl group (CH$_3$), an ethyl group (C$_2$H$_5$), a propyl group (CH$_2$CH$_2$CH$_3$), an isopropyl group (CH$_2$(CH$_3$)CH$_3$), a butyl group (CH$_2$CH$_2$CH$_2$CH$_3$), an alkoxysilyl group (Si(OCH$_2$CH$_3$)$_3$) and the like.

Among the silicon alkoxide, tetramethoxysilane (above all R are methyl) and tetraethoxysilne (above all R are ethyl) is especially preferred.

The basic compound which is contained in the water soluble binder of the photocatalytic coating solution and is used to hydrolyze the silicon alkoxide is represented by the following Formula (2).

$$R_X-\text{NH}_{4-X} \tag{2}$$

R in Formula (2) independently represents a hydrogen atom or a functional group. R may be the same or different each other. As the functional group: R specifically, for example, includes a hydrogen atom (H), a methyl group (CH$_3$), an ethyl group (CH$_2$CH$_3$), a propyl group (CH$_2$CH$_2$CH$_3$), an isopropyl group (CH$_2$(CH$_3$)CH$_3$), a butyl group (CH$_2$CH$_2$CH$_2$CH$_3$), a methylol group (CH$_2$OH), an ethylol group (CH$_2$CH$_2$OH) and the like. Incidentally, when the hydrogen atom in Formula (2) is substituted by a functional group other than the hydrogen atom, a quaternary amine represented by the following Formula (3) is formed.

$$R_4N^+X^- \tag{3}$$

The quaternary amine may be a salt with counter anion which is represented X$^-$ in Formula (3). Specifically, X includes a hydroxy group (OH), a halogen group (F, Cl, Br, I) and the like. Among the salts, tetramethylammonium hydroxide may be preferably employed.

The polar solvent which is a part of the water soluble binder and is provided to a reaction together with the silicon alkoxide and the basic compound includes water, alcohols (ex. methanol, ethanol, isopropanol), glycols (ex. glycerin, methyl cellosolve, ethyl cellosolve, propyl cellosolve) and ketones (ex. acetone, diacetone alcohol, acetylacetone, methyl ethyl ketone). Above-mentioned polar solvents may be employed alone or combined with two or more plurally. Among these, acetone may be preferably employed.

The silicon alkoxide, the basic compound, the polar solvent and water are mixed with stirring, obtained product is dissolved in water or an alcohol. The resultant mixture is adjusted at pH=5 to 8 by adding an acid or ion-exchanging, and is used as the water soluble binder. The silicon alkoxide was hydrolyzed.

The photocatalytic particles are dispersed in the photocatalytic coating solution, and the hydrolytic silicate which is prepared in the above-mentioned conditions is dissolved or dispersed therein. In order to prepare the photocatalytic coating solution, a photocatalytic dispersive solution is preliminarily prepared so that the photocatalytic particles are dispersed in the polar solvent. The photocatalytic coating solution is prepared by mixing with stirring the photocatalytic dispersive solution. Thus photocatalytic coating solution specifically includes TA-801-G, TA-802-G, TA-803-G (manufactured by Shin-Etsu Chemical Co., Ltd.) and the like.

A concentration of photocatalytic solid ingredients in the photocatalytic coating solution is 0.01 to 10% by mass, preferably 0.1 to 5% by mass. If the concentration of photocatalytic solid ingredients is less than 0.01% by mass, an antifouling activity achieved by the photocatalyst tends to be reduced. If the concentration of photocatalytic solid ingredients is greater than 10% by mass, the appearance tends to be detracted and transparency tends to be reduced. A solid concentration ratio of the photocatalytic particles to the hydrolytic silicate in the photocatalytic solution is 0.5:99.5 to 99.5:0.5, as the ratio of "mass of a photocatalytic solid:mass of a silicate solid". The preferred ratio is 5:95 to 95:5. If the ratio of the photocatalytic solid by mass is less than 5, antifouling activity is difficult to obtain even if hydrophilicity and oxidative degradation are sufficient. If the ratio of the photocatalytic solid by mass is greater than 95, peeling and cracking tend to be caused to the photocatalytic film due to intensity reduction.

The substrate on which the photocatalytic coating solution is applied is not restricted, as long as a thin-film of the photocatalytic film can be formed. In order to apply the photocatalytic coating solution onto the substrate, any conventional well-known method may be employed. Specifically, a coated film of the photocatalytic coating solution may be formed onto the substrate by using a dip coating method, a spin coating method, a spray coating method, a brush coating method, an infusion method, a roll coating method, a wire bar method, a die coating method, a gravure printing method, an ink jet method and the like.

A thickness of the coated film is ranged from 1 to 500 nm, and especially ranged from 50 to 300 nm preferably. If the thickness is too thin, intensity tends to be reduced. If the thickness is too thick, cracking tends to be caused.

In order to prepare the coated film by applying and then curing the photocatalytic coating solution through drying, the coated film is preferably prepared by treating at a temperature range of 50 to 200° C. for 1 to 120 minutes, especially at the temperature range of 60 to 110° C. for 5 to 60 minutes preferably.

(5: Adhesive Layer)

As the adhesive layer for the thermal insulation laminate and the transparent thermal insulation film, a silicone-based adhesive is preferred. As the silicone-based adhesive, a generally used silicone-based adhesive which contains a heat curing type liner organopolysiloxane and a solid silicone resin may be employed. As the heat curing type silicone-based adhesive, an organic peroxide curing type and a platinum addition curing type are known. However when a polyethylene film or polypropylene film having a stretching property is employed as the substrate, the platinum addition curing type silicone adhesive which is able to cure at relatively low temperature is especially preferred, because the substrate tends to deform by heat.

The organic peroxide curing type silicone-based adhesive contains an organopolysiloxane mixture and an organic peroxide wherein the organopolysiloxane mixture contains a liner organopolysiloxane and an organopolysiloxane copolymer resin comprising ($R_3SiO_{1/2}$) unit and ($SiO_2$) unit (R represents a substituted or unsubstituted monovalent hydrocarbon group, and a ratio of ($R_3SiO_{1/2}$) unit to ($SiO_2$) unit is 0.5 to 1.5 by mole), and the organic peroxide as a cross-linking curing agent is benzoyl peroxide, bis(4-methylbenzoyl)peroxide, 2,5-dimethyl-2,5-bis(t-butylperoxy)hexan and the like. The platinum addition curing type silicone adhesive contains a vinyl group-containing liner organopolysiloxane or the organopolysiloxane copolymer resin described above, an organohydrogenpolysiloxane having a hydrogen atom bonded to silicon as the cross-linking curing agent, and a platinum group metal based catalyst such as platinum chloride acid, an olefin complex with platinum, a vinyl siloxane complex with platinum or the like as the catalyst.

Thus silicone-based adhesive includes, for example, X-40-3270/CAT-PL-50T=100/0.5, X-40-3229/CAT-PL-50T=100/0.5, and X-40-3323/CAT-PL-50T=100/0.25 (manufactured by Shin-Etsu Chemical Co., Ltd.) and the like.

The thickness of the adhesive layer is preferably 5 to 100 μm, more preferably 10 to 50 μm. As a curing condition for the layer is usually 80 to 150° C.

(6: Hard Coat Layer)

As a hard coat layer, a silicone-based hard coat material is preferred. The silicone-based hard coat material is not restricted, but the photocurable silicone-based hard coat material is preferred on the point of view of workability. The photocurable silicone-based hard coat material contains a photoactive group-containing siloxane compound, a (meta) acryl group-containing compound and a radical photopolymerization initiator. Specifically as the photocurable silicone-based hard coat material includes KP-1001, and X-12-2437 (manufactured by Shin-Etsu Chemical Co., Ltd.) and the like. A coating layer is prepared by coating with a coating fluid containing those ingredients onto the thermal insulation laminate and the transparent thermal insulation film comprising polyvinyl butyral, and is cured by irradiation using an UV lamp to obtain the hard coat layer.

A method of forming for the hard coat layer is not restricted, but it is preferable to apply the fluid by using a well-known coating machine selected depending on any coating purposes. For example, as the coating machine for applying the fluid includes a reverse roll coater, a wire bar and a curtain coater. A thickness of the obtained coating layer is ranged from 0.1 to 50 μm and especially ranged from 0.5 to 30 μm is preferred. If the thickness is too thin, abrasion resistance causes to decline. On the other hand, if the thickness is too thick, cracking resistance causes to decline.

In order to obtain the hard coat layer, as a light source for curing, the light source which emits light including wavelength ranging from 200 to 450 nm may be usually employed. As the light source, for example, a high-pressure mercury vapor lamp, an ultrahigh pressure mercury lamp, a metal halide lamp, a xenon lamp and a carbon arc lamp are included. An irradiance level is not restricted, but it is 10 to 5,000 mJ/cm$^2$, especially 20 to 2,000 mJ/cm$^2$ preferably. A curing time is usually 0.5 seconds to 2 minutes and preferably 1 second to 1 minute.

In cases where scratch resistance is not required, the thermal insulation laminate and the transparent thermal insulation film of the present invention may not have the hard coat layer. The thermal insulation laminate and the transparent thermal insulation film shown in FIG. 1 as the first embodiment of the present invention docs not have the hard coat layer.

The thermal insulation laminate and the transparent thermal insulation film may contain an additive further. The additive may be contained in any layer in the thermal insulation laminate and the transparent thermal insulation film. Further, another layer containing the additive may be comprised in the thermal insulation laminate or the transparent thermal insulation film. Also, the additive may be contained in plural layers. Particularly, the additive is preferably contained into polyvinyl butyral being provided for the transparent base plate. When the additive is contained in the transparent base plate comprising the polyvinyl butyral resin which is thicker than the other layer, a sufficient effect is obtained, even if the low additive concentration. For example, in cases where the following ultraviolet absorbing agent is employed as the additive, a sufficient ultraviolet absorbing effect is obtained due to containing polyvinyl butyral therein, even if a concentration of the ultraviolet absorbing agent is low.

The examples of the first additive are the ultraviolet absorbing agent, for example, Visorb 110 (manufactured by KYODO CHEMICAL CO., LTD.), Tinuvin 328 (manufactured by Ciba Specialty Chemicals Inc.), Uvinul A plus (manufactured by BASF SE) and the like include. The examples of the second additive are an antioxidant to prevent oxidation caused by light or heat, or HAILS (manufactured by Hinderd Amine Light Stabilizer). The first additive and the second additive may be each other contained in the different layer or the same layer.

EMBODIMENTS

The present invention will now be described in more specific by way of examples thereof; however the scope of the present invention is not restricted by the examples described below. Many modifications may be appropriately made within the scope of the present invention, with all of these modifications deemed to fall within the technical scope of the invention.

An evaluation method and a measurement method employed in the examples are described below. Also in the examples, the term "parts" means "parts by mass", "%" means "% by mass", unless specifying otherwise.

1. Measurement of Thermal Conductivity

Thermal conductivity was measured according to the transient hot wire method (probe method) described in Japanese Industrial Standard R 2618 by using a thermal conductivity meter (QTM-500; manufactured by Kyoto Electronics Manufacturing Co., Ltd.). In order to measure the thermal conductivity, a constant electric power was continually supplied to samples of the thermal insulation laminated bodies having dimensions of 100×50×1 mm while a rising rate of temperature of a heater wire was recorded, and then the thermal conductivity of the samples were determined on the basis of the temperature gradient.

2. Measurement of Diffusivity of Transmitted Light

A diffusivity of transmitted light was measured by using an automatic angle changing photometer (GP-200; manufactured by Murakami Color Research Laboratory Co., Ltd.). A transmittance measurement mode was the following; an incidence angle of light rays: 60 deg.; a light receiving angle: −90 deg. to 90 deg.; SENSITIVITY: 150; HIGH VOLTON: 500; a filter: using ND10; a light beam aperture: 10.5 mm (VS-13.0); a light receiving aperture: 9.1 mm (VS-34.0); an angle changing intervals: 0.1 deg. According to the results of the transmittance, an angle width (deg.) and a height of a peak of the transmittance was determined by figuring from starting-rise angle to terminating-fall angle thereof. The angle width presents the diffusivity and the peak height presents a transmittivity.

3. Total Light Transmittance

The total light transmittance was measured according to Japanese Industrial Standard K 7150-1981 by using a haze meter "NDH-2000" manufactured by NIPPON DENSHOKU INDUSTRIES CO., LTD. The total light transmittance substantially coincides with the visible light transmittance.

4. Appearance of Film

Existence or non-existence of a poor appearance such as an undulation pattern in the surfaces of the film was discriminated by visual observation. When the poor appearance was no-existence, the film was evaluated "good" and when the poor appearance was existence, the film was evaluated "poor".

5. Average Fiber Diameter and Average Particle Diameter

Electron microscope photographs of surface of the obtained silica fibers and hollow silica particles were taken by Scanning Electron Microscope (S-4700II; manufactured by Hitachi Ltd.). In a random manner, 20 areas were selected from the photographs and these diameters were measured. Averages were calculated from all measurement results (n=20), the resultant average values were defined as the average fiber diameter of the silica fibers and the average particle diameter of the hollow silica particles respectively.

6. Evaluation of Antifouling Property

An antifouling property was evaluated as following. Onto samples of diffusion films which was cut out as so to have 5×5 cm, 1 mL of 10 μmol/L methylene blue solution was applied. Lights from white LED were irradiated onto the surface of the samples of the diffusion films for 3 hours so that the light quantity was 10,000 Lux thereon. When blue color was disappearance, it was evaluated as "excellent", and when the blue color was remained, it was evaluated as "bad".

Example 1

Preparing of Transparent Plate 100 parts by weight of the polyvinyl butyral resin (S-LEC SV-05; manufactured by SEKISUI CHEMICAL CO., LTD.) was mixed into 500 parts by weight of methylene chloride to be dissolved. The resultant resin solution was applied to a 100 μm-thick polyester film by a solution casting method using a coater (Pipe doctor coat; manufactured by YOKOYAMA Corporation) having 1 mm of a slit width. The resultant coated film was dried at 100° C. for 20 minutes, thereby a transparent base plate having 200 μm-thickness for the transparent thermal insulation layer was obtained.

(Preparing of Silica Fiber Assembly)

To the nozzle made from graphite, quartz glass fibers having 0.3 mm diameter were supplied by a feeding-roller, tips of the quartz glass fibers were melted and softened by oxyhydrogen burner flames which were blasted from an orthogonal direction with respect to a feeding direction thereof. A device which can be moved to XY two-directions was placed at the opposite position from the nozzle with 150 mm distance and a stainless substrate was supported on the device. A direct current of high voltage of 20 kV was applied between the nozzle and the stainless substrate, thereby silica fibers having 300 nm of diameters were deposited from tips of melted glass on the stainless substrate by the electrostatic power.

(Preparing of Hollow Silica Particles)

Crystals of calcium carbonate were grown so that the outer diameter is 8 to 85 nm, and then the resultant crystals were aged and dehydrated. The resultant product was powdered to obtain dried calcium carbonate shaped in solid fine particles, and it was dispersed in ethanol. Then, silicon alkoxide and ammonia were added to the resultant mixture, and fine particles of calcium carbonate ($CaCO_3$) were covered with silica ($SiO_2$) by a sol-gel method. As silicon alkoxide, tetractoxysilane (TEOS) (KBE-04; manufactured by Shin-Etsu Chemical Co., Ltd.) was employed. As ammonia, ammonia-water of 28% by weight was employed.

Thus produced silica coating particles were washed, thereafter it was dispersed in water. Hydrochloric acid was added thereto, calcium carbonate, which is inside of the particles, was resolved and flowed out, and thereby the cubic-shaped hollow silica particles having outflow holes were formed. The outflow holes which were formed by flowing out calcium carbonate were obstructed by heating at 400° C. in a heating step to prepare hollow silica particles. The outer diameter of the hollow silica particles was 80 nm.

(Preparing of Transparent Thermal Insulation Layer)

To 100 parts by weight of above silica fiber assembly, 10 parts by weight of above hollow silica particles were mixed. The resultant mixture was sandwiched with above two transparent base plates of polyvinyl butyral having 200 μm-thickness, and the resultant material was heated at 100° C. for 10 minutes. Thereby the transparent thermal insulation layer was obtained.

(Preparing of Thermal Insulation Laminate)

A photocatalytic coating solution (TA-801-G; manufactured by Shin-Etsu Chemical Co., Ltd.), in which photocatalytic particles were dispersed and a water-soluble silicate binder was contained with a solvent, was applied to one side of the transparent insulation layer by the wire bar method, and the resultant material was treated with heat at 100° C. for 30 minutes in an oven. Thereby a photocatalytic layer having 200 nm-thickness was formed thereon. A silicone-based adhesive (X-40-3270/CAT-PL-50T=100/0.5; manufactured by Shin-Etsu Chemical Co., Ltd.) was applied to the other side of the transparent thermal insulation layer by the wire bar method. The resultant material was treated with heat at 130° C. for 2 minutes in an oven. Thereby the adhesive layer with 30 μm-thickness was laminated to the transparent thermal insulation layer. Measured values and properties of the thermal insulation laminate of Example 1, which was obtained in this manner, are shown in Table 1.

Example 2

A thermal insulation laminate was obtained the same manner as Example 1 except for using the glass fibers having diameter of 300 nm, which were made from borosilicate glass fibers instead of the quartz glass in production of the fiber assembly in Example 1. Measured values and properties of the thermal insulation laminate of Example 2 are shown in Table 1.

Example 3

A photocurable silicone-based hard coat material (KP-1001; manufactured by Shin-Etsu Chemical Co., Ltd.) was applied to both sides of a transparent thermal insulation layer prepared as well as Example 1 by the wire bar method. The resultant material was irradiated with light of 375 nm wavelength at 1200 mJ/cm$^2$ for 1 minute by the high-pressure mercury vapor lamp. Thereby a hard coat layer with 3 μm-thickness was obtained. A photocatalytic coating solution (TA-801-G; manufactured by Shin-Etsu Chemical Co., Ltd.), in which photocatalytic particles were dispersed and a water-soluble silicate binder was contained with a solvent, was applied to one side of the hard coat layer by the wire bar method. The resultant material was treated with heat at 100° C. for 30 minutes in an oven, a photocatalytic layer having 200 nm-thickness was obtained. A silicone-based adhesive (X-40-3270/CAT-PL-50T=100/0.5; manufactured by Shin-Etsu Chemical Co., Ltd.) was applied to the other side of the hard coat layer by the wire bar method. The resultant material was treated with heat at 130° C. for 2 minutes in an oven, thereby the adhesive layer with 30 μm-thick was laminated onto the hard coat layer. Measured values and properties of the thermal insulation laminate of Example 3 obtained in this manner are shown in Table 1.

Comparative Example 1

A transparent thermal insulation layer was obtained in the same manner as Example 1, except that the hollow silica particles was altered by a fumed silica (Aerosil RY50; primary particle diameter: 40 nm; manufactured by Nippon Aerosil Co., Ltd.). A photocatalytic layer and an adhesive layer were laminated the same manner as Example 1 onto both sides in this transparent thermal insulation layer. Thereby a thermal insulation laminate of Comparative Example 1 was obtained. Measured values and properties of a thermal insulation laminate of Comparative Example 1 are shown in Table 1.

Comparative Example 2

A transparent thermal insulation layer was obtained in the same manner as Example 1 except that diameter of the fibers in the fiber assembly was changed to 800 nm. A photocatalytic layer and an adhesive layer were laminated the same manner as Example 1 to both sides of this transparent thermal insulation layer. Thereby a thermal insulation laminate of Comparative Example 2 was obtained. Measured values and properties of a thermal insulation laminate of Comparative Example 2 are shown in Table 1.

Comparative Example 3

A fine particles layer containing polystyrene-based polymer beads was laminated onto one side of a polyvinyl butyral film having 200 μm-thickness corresponding to the transparent base plate by a coating method. Thereby a thermal insulation laminate of Comparative Example 3 was obtained. Measured values and properties of the thermal insulation laminate of Comparative Example 3 are shown in Table 1.

Comparative Example 4

A fine particles layer containing acryl-based resin was laminated onto one side of a polyvinyl butyral film having 200 μm-thickness corresponding to the transparent base plate by a coating method. Thereby a thermal insulation laminate of Comparative Example 4 was obtained. Measured values and properties of the thermal insulation laminate of Comparative Example 4 are shown in Table 1.

TABLE 1

| | Thermal conductivity [W/m K] | Total light ray transmittance [%] | Appearance | Antifouling property |
|---|---|---|---|---|
| Example 1 | 0.02 | 89 | good | excellent |
| Example 2 | 0.02 | 89 | good | excellent |
| Example 3 | 0.02 | 89 | good | excellent |
| Comparative Example 1 | 0.15 | 42 | poor | excellent |
| Comparative Example 2 | 0.02 | 30 | poor | excellent |
| Comparative Example 3 | 0.2 | 87 | good | bad |
| Comparative Example 4 | 0.2 | 87 | good | bad |

What is claimed is:

1. A thermal insulation laminate comprising:
   a photocatalytic layer;
   a transparent thermal insulation layer having two transparent base plates and composite materials as a mixture comprising a fiber assembly and inorganic hollow particles therebetween; and
   an adhesive layer;
   wherein the photocatalytic layer is an outermost layer of one side of the thermal insulation laminate, and the adhesive layer is an outermost layer of other side thereof.

2. The thermal insulation laminate according to claim 1, wherein a hard coat layer is sandwiched in either at least one of between the photocatalytic layer and the transparent thermal insulation layer, and between the transparent thermal insulation layer and the adhesive layer.

3. The thermal insulation laminate according to claim 2, wherein the hard coat layer is composed of a silicone-based hard coat material.

4. The thermal insulation laminate according to claim 3, wherein the silicone-based hard coat material is a photocurable silicone-based hard coat material.

5. The thermal insulation laminate according to claim 1, wherein a material of the transparent base plate is a polyvinyl butyral.

6. The thermal insulation laminate according to claim 1, wherein a fiber diameter of the fiber assembly is 700 nm at a maximum.

7. The thermal insulation laminate according to claim 1, wherein the fiber assembly is composed of consecutive or non-consecutive silica fiber spun by an electrospinning method.

8. The thermal insulation laminate according to claim 1, wherein the inorganic particles are hollow silica particles.

9. The thermal insulation laminate according to claim 1, wherein the photocatalytic layer is formed by applying a coating solution containing photocatalyst particles and a water soluble binder.

10. The thermal insulation laminate according to claim 9, wherein the photocatalyst particles are photocatalytic particles supporting metal, metal oxide or/and metal compound wherein metal thereof is selected from the group consisting of vanadium, manganese, iron, cobalt, nickel, copper, zinc, niobium, molybdenum, ruthenium, rhodium, silver, tin, tungsten, platinum and gold on crystalline fine particles of metal oxide having n-type semiconductivity.

11. The thermal insulation laminate according to claim 9, wherein the water soluble binder contains a compound which a hydrolytic silicon compound is hydrolyzed in a mixture solvent of water, a basic compound and a polar solvent.

12. The thermal insulation laminate according to claim 1, wherein the adhesive layer is composed of a silicone-based adhesive.

13. The thermal insulation laminate according to claim 1, wherein a total light transmittance of the thermal insulation laminate is at least 60%.

14. A transparent thermal insulation film comprising of the thermal insulation laminate according to claim 1.

15. The thermal insulation laminate according to claim 1, wherein the fiber assembly comprises consecutive or non-consecutive silica fiber having a diameter less than 500 µm and a length more than 5 µm or more, and the inorganic particles are hollow silica particles having a diameter between 30 nm and 130 nm.

* * * * *